(12) United States Patent
Newham et al.

(10) Patent No.: US 9,753,874 B2
(45) Date of Patent: Sep. 5, 2017

(54) MULTI-STEP PROGRAMMING OF HEAT-SENSITIVE NON-VOLATILE MEMORY (NVM) IN PROCESSOR-BASED SYSTEMS

(71) Applicant: QUALCOMM Incorporated, San Diego, CA (US)

(72) Inventors: Adam Edward Newham, Poway, CA (US); Rashid Ahmed Akbar Attar, San Diego, CA (US); Seung Hyuk Kang, San Diego, CA (US); Jung Pill Kim, San Diego, CA (US); Sungryul Kim, San Diego, CA (US); Taehyun Kim, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 14/627,318

(22) Filed: Feb. 20, 2015

(65) Prior Publication Data

US 2016/0246608 A1 Aug. 25, 2016

(51) Int. Cl.
*G06F 13/28* (2006.01)
*G06F 12/02* (2006.01)
*G06F 9/44* (2006.01)

(52) U.S. Cl.
CPC ............ *G06F 13/28* (2013.01); *G06F 9/4406* (2013.01); *G06F 12/0246* (2013.01); *G06F 2212/7209* (2013.01)

(58) Field of Classification Search
CPC ...... G06F 8/66; G06F 12/0238; G06F 9/4406; G06F 9/4401; G06F 9/4403; G06F 13/28

USPC .............................................................. 713/2
See application file for complete search history.

(56) References Cited

U.S. PATENT DOCUMENTS

| 7,730,295 | B1 * | 6/2010 | Lee ...................... G06F 9/4401 713/1 |
| 8,181,007 | B2 | 5/2012 | Liu |
| 9,582,443 | B1 * | 2/2017 | Switzer ................. G06F 13/385 |
| 2003/0106052 | A1 * | 6/2003 | Morrison .................. G06F 8/65 717/170 |

(Continued)

*Primary Examiner* — Thomas Lee
*Assistant Examiner* — Santosh R Poudel
(74) *Attorney, Agent, or Firm* — Qualcomm Incorporated

(57) ABSTRACT

Multi-step programming of heat-sensitive non-volatile memory (NVM) in processor-based systems, and related methods and systems are disclosed. To avoid relying on programmed instructions stored in heat-sensitive NVM during fabrication, wherein the programmed instructions can become corrupted during thermal packaging processes, the NVM is programmed in a multi-step programming process. In a first programming step, a boot loader comprising programming instructions is loaded into the NVM. The boot loader may be loaded into the NVM after the thermal processes during packaging are completed to avoid risking data corruption in the boot loader. Thereafter, the programmed image can be loaded quickly into a NV program memory over the peripheral interface using the boot loader to save programming time and associated costs, as opposed to loading the programmed image using lower transfer rate programming techniques. The processor can execute the program instructions to carry out tasks in the processor-based system.

31 Claims, 4 Drawing Sheets

(56) References Cited

U.S. PATENT DOCUMENTS

| | | | |
|---|---|---|---|
| 2006/0064576 A1* | 3/2006 | Chen | G06F 9/4401 |
| | | | 713/2 |
| 2006/0205514 A1* | 9/2006 | Cockerille | G07F 17/32 |
| | | | 463/43 |
| 2006/0205515 A1* | 9/2006 | Cockerille | G07F 17/32 |
| | | | 463/43 |
| 2007/0083744 A1* | 4/2007 | Seok | G06F 9/4401 |
| | | | 713/1 |
| 2007/0233955 A1 | 10/2007 | Luo et al. | |
| 2008/0126588 A1* | 5/2008 | Chong | G06F 13/387 |
| | | | 710/13 |
| 2010/0146256 A1 | 6/2010 | Luo et al. | |
| 2011/0258403 A1 | 10/2011 | Schnepper | |
| 2011/0264899 A1* | 10/2011 | Evans | G01R 31/3682 |
| | | | 713/1 |
| 2013/0191568 A1 | 7/2013 | Hershko et al. | |
| 2014/0075169 A1* | 3/2014 | Andrews | G06F 9/4416 |
| | | | 713/2 |
| 2014/0122901 A1 | 5/2014 | Bilke et al. | |
| 2014/0129820 A1* | 5/2014 | Lim | G06F 9/4401 |
| | | | 713/2 |
| 2014/0244991 A1* | 8/2014 | Akdemir | G06F 8/66 |
| | | | 713/2 |
| 2015/0143097 A1* | 5/2015 | Yamashita | G06F 9/44505 |
| | | | 713/2 |
| 2015/0149715 A1* | 5/2015 | Davis | G06F 12/0238 |
| | | | 711/105 |
| 2017/0123881 A1* | 5/2017 | Seo | G06F 11/0727 |

\* cited by examiner

MULTI-STEP PROGRAMMING OF HEAT-SENSITIVE NON-VOLATILE MEMORY (NVM) IN PROCESSOR-BASED SYSTEMS

BACKGROUND

I. Field of the Disclosure

The technology of the disclosure relates generally to programming of non-volatile memory (NVM) in a processor-based system with a programming image comprised of instructions to be executed by a processor(s) in the processor-based system.

II. Background

A memory cell is a basic building block of computer data storage, which is also known as "memory." Processor-based systems include memory for storing information. The memory may be used to store program instructions executed by a processor as well as data for use in executing program instructions. In certain embedded processor-based systems, non-volatile memory is embedded on a printed circuit board (PCB) separately from a processor and other peripherals and electronic components. In other embedded processor-based systems, non-volatile memory can be embedded in a system-on-a-chip (SOC) that also contains a central processing unit (CPU) or other processor and other supporting components. In either case, the non-volatile memory is configured to store embedded firmware that is executed by the processor on power-up starting at the reset vector address. The firmware stored in non-volatile memory is persistent over power cycles. An example of non-volatile memory is flash memory.

During fabrication of embedded processor-based systems, it may be desired to pre-program the memory with a program image of firmware during fabrication and/or assembly processes. In this manner, the processor-based system is already programmed when assembled and coming off a production line. The processor-based system can execute the pre-programmed firmware at first power-up. Programming interfaces, such as Joint Test Action Group (JTAG) interface or serial wire debug (SWD) interface, can be employed to program embedded memory. It may also be desired to program data in non-volatile memory in an embedded processor-based system during fabrication and/or assembly processes to test the integrity of data storage. For example, data patterns can be programmed into the non-volatile memory to determine if memory bitcells are defective.

For SOC processor-based systems, the non-volatile memory can be programmed at the chip die level before post-packaging processes are performed to allow the die to be tested by execution of the programmed firmware by the processor. This also allows the firmware to be pre-programmed in the non-volatile memory before the processor-based system is processed during packaging and post-packaging processes. However, if heat-sensitive memory is used as the non-volatile memory, the firmware programmed into the non-volatile memory at the chip die level may become corrupted. During assembly processes, the embedded memory on the PCB or in the SOC are exposed to extreme thermal conditions, such as a plastic molding process and/or a solder reflow process when the semiconductor devices are adhered to the PCB. For example, magnetic random access memory (MRAM) is a heat-sensitive non-volatile memory that has an advantage of retaining data after power is removed, but its ability to retain data is related exponentially to its temperature.

Thus, for processor-based systems that employ heat-sensitive non-volatile memory for storing firmware, to avoid risking data corruption, the non-volatile memory can be pre-programmed with a firmware image in-situ once the PCB of the processor-based system has been fabricated on a production line. However, the programming speed may be relatively slow, especially for large memory blocks, and thus cost prohibitive. For example, a JTAG programming interface typically has data transfer rates around twenty (20) megabits per second (Mbps). Thus, it would take approximately 12.8 seconds to load for a thirty-two (32) megabyte (MB) firmware image memory using a JTAG programming device. Alternatively, a separate read-only memory (ROM) that is not sensitive to the extreme temperatures experienced during the packaging processes could be employed in the processor-based system to store a programmed boot loader. For example, the ROM may be infused and/or provided in metal layers to be insensitive to extreme temperatures. The programmed boot loader could then be executed by the processor during post-packaging processes to load the firmware image into heat-sensitive non-volatile memory. However, this technique involves providing a separate ROM with separate associated cost. Also, the boot loader programmed into the ROM may have lower data transfer rates.

SUMMARY OF THE DISCLOSURE

Aspects disclosed in the detailed description include multi-step programming of heat-sensitive non-volatile memory (NVM) in processor-based systems. Related methods and systems are also disclosed. As a non-limiting example, the programmed heat-sensitive NVM may be magnetic random access memory (MRAM), which has the advantage of retaining stored data through magnetization orientations in a magnetic tunnel junction (MTJ) without having to be powered. To avoid relying on programmed instructions stored in heat-sensitive NVM during fabrication for testing purposes, wherein the programmed instructions can become corrupted during subsequent thermal packaging processes, the heat-sensitive NVM in the processor-based system is programmed in a multi-step programming process. In a first programming step, a boot loader comprising programming instructions is loaded into the heat-sensitive NVM. The boot loader may be loaded into the heat-sensitive NVM after the processor-based system is packaged to avoid the boot loader from being exposed to thermal processes during packaging and risking corruption. In a second programming step, the processor in the processor-based system can execute the programming instructions in the boot loader stored in the heat-sensitive NVM to load a programmed image comprising program instructions over a higher-speed peripheral interface into a non-volatile (NV) program memory. In this manner, the programmed image can be loaded quickly into NV program memory over the peripheral interface using the boot loader to save programming time and associated costs, as opposed to loading the programmed image using lower transfer rate programming techniques, such as joint test action group (JTAG) or serial wire device (SWD) compatible programming devices, as examples. The processor can then execute the program instructions in the NV program memory to carry out tasks in the processor-based system according to program instructions.

In this regard, in one aspect, a processor-based system is provided. The processor-based system comprises a MRAM. The MRAM is configured to store a programmed image comprising program instructions. The processor-based system also comprises a processor. The processor is configured to access the program instructions stored in the programmed image in the MRAM and execute the program instructions. The processor-based system also comprises a peripheral interface. The peripheral interface is configured to exchange data between the processor and an external programming device communicatively coupled to the peripheral interface. The processor-based system also comprises a first NVM. The first NVM is configured to store a programmed boot loader comprising programming instructions configured to be executed by the processor to exchange data with the peripheral interface. The processor is configured to execute the programming instructions in the programmed boot loader in the first NVM to receive the programmed image over the peripheral interface from an external programming device communicatively coupled to the peripheral interface, and load the received programmed image into the MRAM.

In another aspect, a method of programming heat-sensitive NVM in a processor-based system is provided. The method comprises programming a boot loader comprising programming instructions into a first NVM in the processor-based system. The method also comprises executing the programming instructions in the boot loader by a processor for receiving a programmed image comprising instructions over a peripheral interface from an external programming device communicatively coupled to the peripheral interface, and loading the received programmed image into a MRAM to be executed by the processor.

In another aspect, a processor-based system is provided. The processor-based system comprises a processor. The processor-based system also comprises a peripheral interface. The peripheral interface is configured to exchange data between the processor and an external programming device communicatively coupled to the peripheral interface. The processor-based system also comprises a first NVM. The first NVM is configured to store a lower-level boot loader comprising lower-level programming instructions. The processor-based system also comprises a non-volatile (NV) instruction memory. The NV instruction memory is configured to store a higher-level boot loader comprising higher-level programming instructions configured to be executed by the processor to exchange data with the peripheral interface. The processor-based system also comprises a NV program memory. The NV program memory is configured to store a programmed image comprising program instructions. The processor is configured to access program instructions stored in the programmed image in the NV program memory and execute the program instructions. The processor is further configured to execute the lower-level programming instructions in the lower-level boot loader in the first NVM to load the higher-level boot loader into the NV instruction memory. The processor is also further configured to execute the higher-level programming instructions in the higher-level boot loader in the NV instruction memory to receive the programmed image from the peripheral interface from an external programming device communicatively coupled to the peripheral interface, and load the received programmed image into the NV program memory.

In another aspect, a method of programming heat-sensitive NVM in a processor-based system is provided. The method comprises programming a lower-level boot loader comprising lower-level programming instructions into a first NVM in the processor-based system. The method also comprises executing the lower-level programming instructions in the lower-level boot loader in the first NVM by a processor for receiving a higher-level boot loader comprising higher-level programming instructions over a peripheral interface from an external programming device communicatively coupled to the peripheral interface, and loading the received higher-level boot loader into a non-volatile (NV) instruction memory. The method also comprises executing the higher-level programming instructions in the higher-level boot loader in the NV instruction memory by a processor for receiving a programmed image comprising instructions over the peripheral interface from an external programming device communicatively coupled to the peripheral interface, and loading the received programmed image into a NV program memory to be executed by the processor.

DETAILED DESCRIPTION

Figure 1:
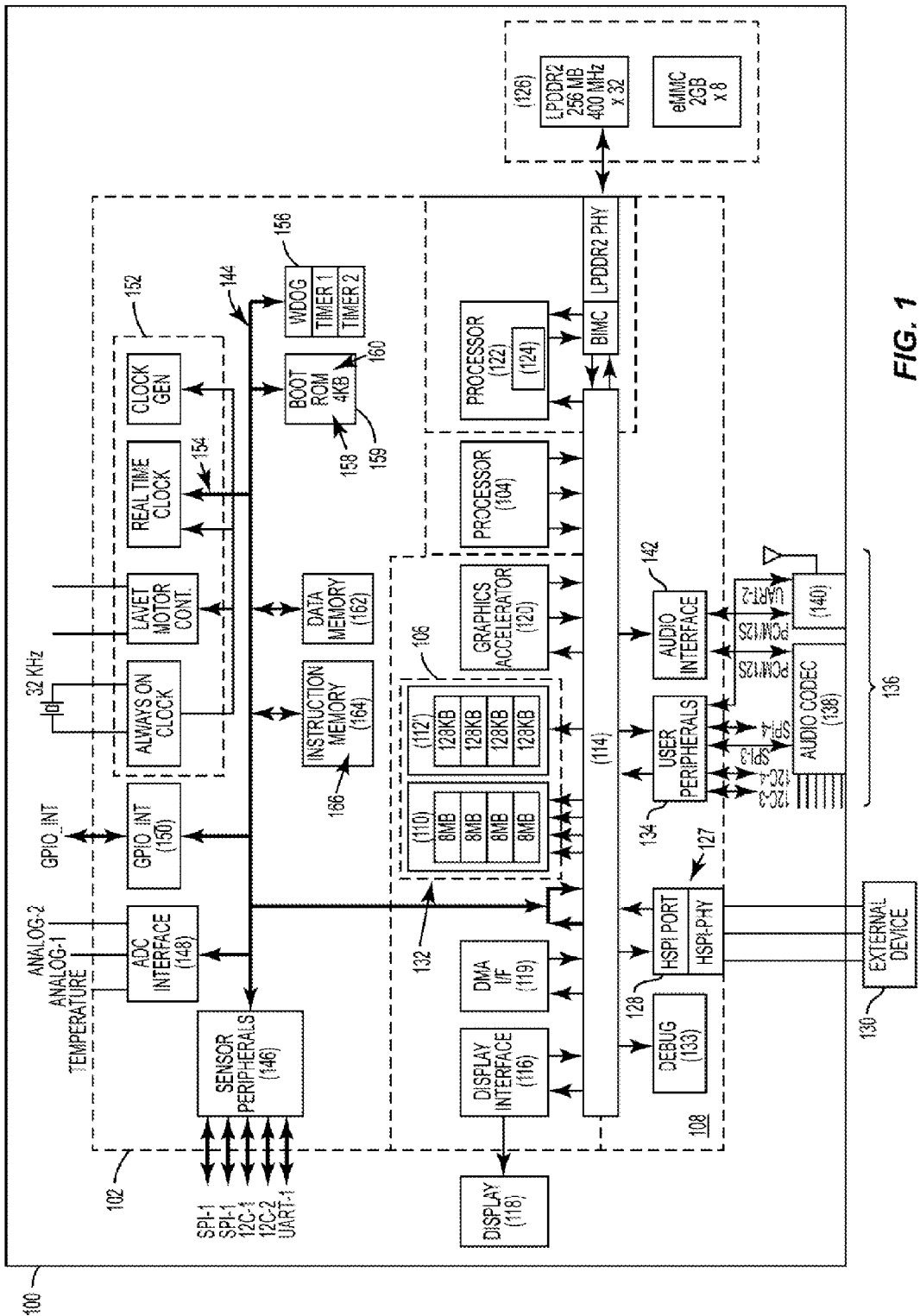
FIG. 1 is an exemplary processor-based system configured to support a multi-step programming of heat-sensitive non-volatile memory (NVM) to load a programmed image comprising program instructions into a non-volatile (NV) program memory to be executed by a processor.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include multi-step programming of heat-sensitive non-volatile memory (NVM) in processor-based systems. Related methods and systems are also disclosed. As a non-limiting example, the programmed heat-sensitive NVM may be magnetic random access memory (MRAM), which has the advantage of retaining stored data through magnetization orientations in a magnetic tunnel junction (MTJ) without having to be powered. To avoid relying on programmed instructions stored in heat-sensitive NVM during fabrication for testing purposes, wherein the programmed instructions can become corrupted during subsequent thermal packaging processes, the heat-sensitive NVM in the processor-based system is programmed in a multi-step programming process. In a first programming step, a boot loader comprising programming instructions is loaded into the heat-sensitive NVM. The boot loader may be loaded into the heat-sensitive NVM after the processor-based system is packaged to avoid the boot loader from being exposed to thermal processes during packaging and risking corruption. In a second programming step, the processor in the processor-based system can execute the programming instructions in the boot loader stored in the heat-sensitive NVM to load a programmed image comprising program instructions over a higher-speed peripheral interface into a non-volatile (NV) program memory. In this manner, the programmed image can be loaded quickly into NV program memory over the peripheral interface using the boot loader to save programming time and associated costs, as opposed to loading the programmed image using lower transfer rate programming techniques, such as joint test action group (JTAG) or serial wire device (SWD) compatible programming devices, as examples. The processor can then execute the program instructions in the NV program memory to carry out tasks in the processor-based system according to program instructions.

In this regard, FIG. 1 is an exemplary processor-based system 100 configured to support a multi-step programming of heat-sensitive NVM to load a programmed image comprising program instructions into a NV program memory to be executed by a processor. The processor-based system 100 in FIG. 1 is a system-on-a-chip (SOC) 102 where a processor 104, memory system 106, and other supporting components are included on a semiconductor die 108. In this example, a NV program memory 110 provided as a NVM is included in the memory system in the form of embedded MRAM. As will be discussed in more detail below, the exemplary multi-step programming processes for loading a programmed image into NVM in the processor-based system 100 in FIG. 1 to be executed by the processor 104 can be loaded into the NV program memory 110. Loading a programmed image into the NV program memory 110 has the advantage of the programmed image being retained over power cycles or resets when power is removed to avoid the need to re-program the same programmed image. Other volatile memory (VM) 112, such as static random access memory (SRAM), may also be included in the memory system 106. Before discussing the exemplary multi-step programming processes for loading a programmed image into NVM in the processor-based system 100 in FIG. 1, a discussion of certain components of the processor-based system 100 are first discussed.

In this regard, with reference to FIG. 1, the memory system 106 is accessible by the processor 104 over a system bus 114. The processor-based system 100 in this example includes a display interface 116 that couples to the system bus 114 to interface a display 118 to the processor 104. The processor 104 can communicate over the system bus 114 to the display interface 116 to display information on the display 118. The processor-based system 100 also includes a direct memory access (DMA) interface 119 that can be accessed by the processor 104 over a system bus 114 for direct memory access. The processor-based system 100 in FIG. 1 also includes a graphics accelerator 120 accessible by the processor 104 over the system bus 114 to perform more complex graphics tasks and calculations for displaying information on the display 118. The processor-based system 100 can also include an additional processor 122 that has on-board cache memory 124. For example, the processor 122 may also be interfaced directly with an optional match co-processor 126 that can be located on the semiconductor die 108 or off-die.

With continuing reference to FIG. 1, the processor-based system 100 in this example includes a number of other devices and peripherals that are interfaced to the system bus 114 to be accessible by the processors 104, 122. For example, a high-speed peripheral interface 127 in the form of a high speed peripheral interface port (HSPI port) 128 can be provided to allow higher speed data transfers between an external device 130 connected to the HSPI port 128 and the processors 104, 122. For example, the HSPI port 128 may be a universal serial bus (USB) port that is compatible with a USB specification (e.g., 2.0, 3.0, 3.x), a high speed secure digital input output (SDIO) interface, a Quad Serial Peripheral Interface (QuadSPI), a dual QuadSPI port, and an Ethernet interface, as non-limiting examples. For example, the HSPI port 128 may be capable of data transfer rates of one hundred (100) Megabits (Mbps) or greater. Also note that the HSPI port 128 could be provided as other high speed interface ports. As will be discussed in more detail below, the external device 130 could be an external programming device that is used to download a programmed image 132 as firmware comprising executable, software instructions into memory in the memory system 106 to be executed as program code by the processors 104, 122. The programmed image 132 could be downloaded into memory in the memory system 106 during fabrication, assembly, or post-assembly process, or thereafter. A debug interface 133 is also provided in the processor-based system 100 in FIG. 1 as another high-speed peripheral interface 127 to provide for a debugging functionality to be accessed over the system bus 114 by the processors 104, 122.

With continuing reference to FIG. 1, the processor-based system 100 also includes a user peripherals interface 134 coupled to the system bus 114 that allows the processors 104, 122 to access user peripherals 136. Examples of these user peripherals 136 include an audio codec 138 and a wireless interface 140, such as a Bluetooth interface. A dedicated audio interface 142 is also coupled to the system bus 114 to allow the processors 104, 122 to access the audio codec 138 and the wireless interface 140.

With continuing reference to FIG. 1, the processor-based system 100 in this example also includes an auxiliary bus 144 that allows a number of other devices to be interfaced to the system bus 114 to be accessible by the processors 104, 122. For example, a sensor peripheral interface 146 allows external sensors to the semiconductor die 108 to be interfaced to and accessible by the processors 104, 122 to receive sensor information from sensors connected to the sensor peripheral interface 146. Note that the sensor peripheral interface 146 could also serve as a high speed peripheral interface (HSPI) to provide for higher speed data transfers between an external device connected to the sensor peripheral interface 146 and the processors 104, 122 for loading a programmed image into NVM in the processor-based system 100 in FIG. 1. An analog-to-digital (ADC) interface 148 can be provided to interface external analog sensors to convert received analog data into digital data to be placed on the auxiliary bus 144. A general purpose input/output (GPIO) interface 150 is interfaced to the auxiliary bus 144 for interfacing GPIO devices to the processor-based system 100. A clock system 152 can be provided to generate a real time clock signal 154 to clock the circuits in the processor-based system 100. A watchdog timer 156 is provided to reset the processors 104, 122 and recover in the event of a software error.

With continuing reference to FIG. 1, a lower-level, first memory 158 in the form of boot read-only memory (ROM) 159 in this example, may also be provided as a NVM. The boot ROM 159 is one-time writeable in this example. The boot ROM 159 may be a small-sized storage device (e.g., 4 kB) that is configured to store a small, lower-level programmed boot loader 160 (referred to as "lower-level boot loader 160") to be executed by a processor 104 or 122 on start-up or reset. The lower-level boot loader 160 can be loaded into the boot ROM 159, such as through joint test action group (JTAG) or serial wire device (SWD) compatible programming devices, as examples. Alternatively, the boot ROM 159 could be programmed as part of a foundry process. In this manner, the lower-level boot loader 160 can be executed on start-up or reset by the processor 104, 122 to then allow the larger programmed image 132 into memory for execution by the processor 104, 122 for operation of the processor-based system 100. It may be desired to employ the lower-level boot loader 160 to load the programmed image 132 into memory during fabrication and/or packaging processes, especially if the processor-based system 100 is a SOC as illustrated in SOC 102 in FIG. 1. The programmed image 132 may be used to assist during fabrication processes for testing the processors 104, 122 and other components of the SOC 102 and/or processor-based system 100. For example, the programmed image 132 may be programmed to write data patterns into NV program memory 110 and/or VM 112 in the memory system 106 to determine if memory bitcells therein are defective. Data memory 162 may be provided to allow for storage of information associated with execution of the lower-level boot loader 160 loaded into the boot ROM 159. However, the data transfer rates possible with the lower-level boot loader 160 to load the programmed image 132 into memory may be slower than desired, thus increasing production time and associated costs. For example, if a JTAG programming interface has a data transfer rate of twenty (20) megabits per second (Mbps), it would take approximately 12.8 seconds for a thirty-two (32) megabyte (MB) programmed image 132 to be loaded using a JTAG programming device.

In this regard, a non-volatile (NV) instruction memory 164 (hereinafter "NV instruction memory 164") may also be provided in the processor-based system 100 in FIG. 1 as another NVM that is larger in size than the boot ROM 159. The NV instruction memory 164 may be heat-insensitive memory. This allows for a larger, programmed higher-level boot loader 166 (referred to as "higher-level boot loader 166") to be stored for execution by a processor 104, 122 to load the programmed image 132 into memory in the memory system 106. This may allow for a more sophisticated boot loader to be stored and executed by the processor 104 or 122 to load the full program image into memory in the memory system 106 in a two-step programming process. A more sophisticated boot loader may allow faster data transfer interfaces, such as the high speed peripheral interface 127 as a non-limiting example, to be employed to transfer the programmed image 132 into memory in the memory system 106, as opposed to JTAG or SWD programming as examples. Higher-speed data transfer protocols, such as the Mobile Industry Processor Interface (MIPI), may also be employed, including over the HSPI port 128, such as described in U.S. Patent Application Publication No. 2013/0191568 A1 entitled "Operating M-PHY Based Communications over Universal Serial Bus (USB) Interface, and Related Cables, Connectors, Systems, and Methods," which is incorporated by reference herein in its entirety. The higher-level boot loader 166 would remain resident in the NV instruction memory 164 to be able to be executed by the processor 104 or 122 to reload or update the programmed image 132 stored in memory in the memory system 106.

The boot ROM 159 may still be provided that is loaded with a lower-level boot loader 160 first, and then the lower-level boot loader 160 may be executed by the processor 104 or 122 to load the higher-level boot loader 166 into the NV instruction memory 164 in a three-step programming process. Alternatively, it may be desired to not provide the boot ROM 159 in the processor-based system 100, but instead provide for the higher-level boot loader 166 to be programmed directly into the NV instruction memory 164 in the first instance in a two-step programming process.

In either programming scenario above, when employing either the lower-level boot loader 160, or the higher-level boot loader 166 during fabrication and/or packaging processes to load the programmed image 132 into memory in the memory system 106, the programmed image 132 may have to be re-loaded during the post-packaging processes of the processor-based system 100. This is because the memory used to store the programmed image 132 may be heat sensitive. For example, the programmed image 132 may be stored in heat-sensitive NV program memory 110, such as MRAM. MRAM is a heat-sensitive non-volatile memory that has an advantage of retaining data after power is removed, but its ability to retain data is related exponentially to its temperature. Thus, the programmed image 132 would have to be re-programmed into the heat-sensitive NV program memory 110 in-situ during post-packaging processes once the processor-based system 100 has been fabricated on the production line, thus increasing production time and associated costs. However, if higher data transfer rates can be employed for loading the programmed image 132 into the NV program memory 110, such as during post-packaging processes, production time increases can be minimized.

In this regard, to avoid relying on the programmed image 132 stored in heat-sensitive NV program memory 110 during fabrication for testing purposes, wherein the programmed image 132 can become data corrupted during subsequent thermal packaging processes, the heat-sensitive NV program memory 110 in the processor-based system 100 is programmed in a multi-step programming process. In a first programming step in this example, the higher-level boot loader 166 is loaded into the NV instruction memory 164 after the processor-based system 100 is packaged, to avoid the higher-level boot loader 166 from being exposed to thermal processes during packaging processes and risking data corruption. This programming step also allows the processor-based system 100 to be pre-programmed during production, so that the processor-based system 100 does not have to be programmed by the customer or end user, except when upgrades are desired. In a second programming step, the processor 104 or 122 in the processor-based system 100 can execute the software instructions in the programmed image 132 in the higher-level boot loader 166 stored in the NV instruction memory 164 to load a programmed image 132 comprising program instructions over a higher-speed peripheral interface, such as the HSPI port 128, into the NV program memory 110. In this manner, the programmed image 132 can be loaded quickly using the higher-level boot loader 166 to save programming time and associated costs during production, including during post-assembly or packaging processes where the NV instruction memory 164 and the NV program memory 110 may be exposed to extreme temperatures, as opposed to loading the programmed image 132 using lower transfer rate programming techniques, such as JTAG or SWD programming devices, as examples. The processor 104, 122 can then execute the instructions in the programmed image 132 stored in NV program memory 110 to carry out tasks in the processor-based system 100 according to the instructions.

Figure 2:
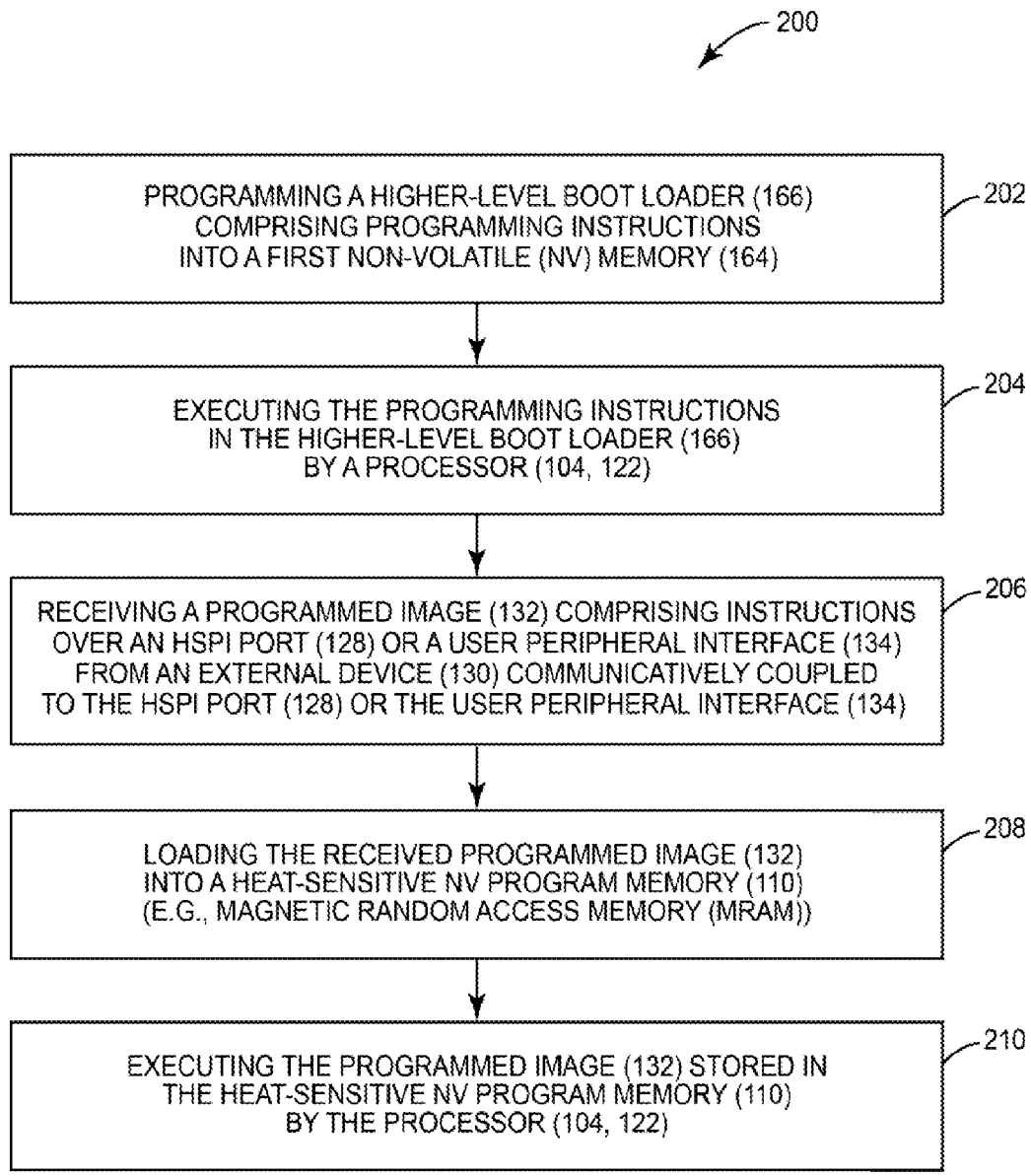
FIG. 2 is a flowchart illustrating an exemplary multi-step programming process for loading a programmed image into NV program memory in the processor-based system in FIG. 1 to be executed by the processor.

Different programming processes may be employed to load the programmed image 132 stored in NV program memory 110 in the processor-based system 100 in FIG. 1. For example, FIG. 2 is a flowchart illustrating an exemplary multi-step programming process 200 for loading the programmed image 132 into NV program memory 110 in the processor-based system 100 in FIG. 1 to be executed by the processor 104, 122. In this regard, the multi-step programming process 200 starts by the higher-level boot loader 166 being loaded into the NV instruction memory 164 as a first NVM (block 202). The higher-level boot loader 166 being loaded into the NV instruction memory 164 by a JTAG or SWD programming device, as examples. Next, the programming instructions in the higher-level boot loader 166 are executed by the processor 104 or 122 to load a programmed image 132 into the NV program memory 110 (blocks 204). In this regard, the programming instructions in the higher-level boot loader 166 are executed by the processor 104 or 122 to receive the programmed image 132 over the high-speed peripheral interface 127, such as the HSPI port 128 or the user peripheral interface 134, from the external device 130 coupled to the high-speed peripheral interface 127 (block 206). As discussed above, the data transfer rate that can be achieved by the higher-level boot loader 166 may be higher and thus reduce loading time during post-packaging or assembly processes for the processor-based system 100. The received programmed image 132 is loaded into the NV program memory 110 by the processor 104, 120 (block 208), so that the programmed image 132 is stored for execution for operating the processor-based system 100.

On start-up or reset of the processor-based system 100, the programmed image 132 in the NV program memory 110 is accessed from the NV program memory 110 by the processor 104 or 122 (block 210). But, at the aforementioned start-up or reset, the processor 104 or 122 may be configured to execute the programming instructions in the higher-level boot loader 166 in the NV instruction memory 164. The processor 104 or 122 will determine if the programmed image 132 is stored in the NV program memory 110. If the programmed image 132 is stored in the NV program memory 110 from a previous loading, the processor 104 or 122 will bypass the programming steps in blocks 204 and 206 discussed above.

Figure 3:
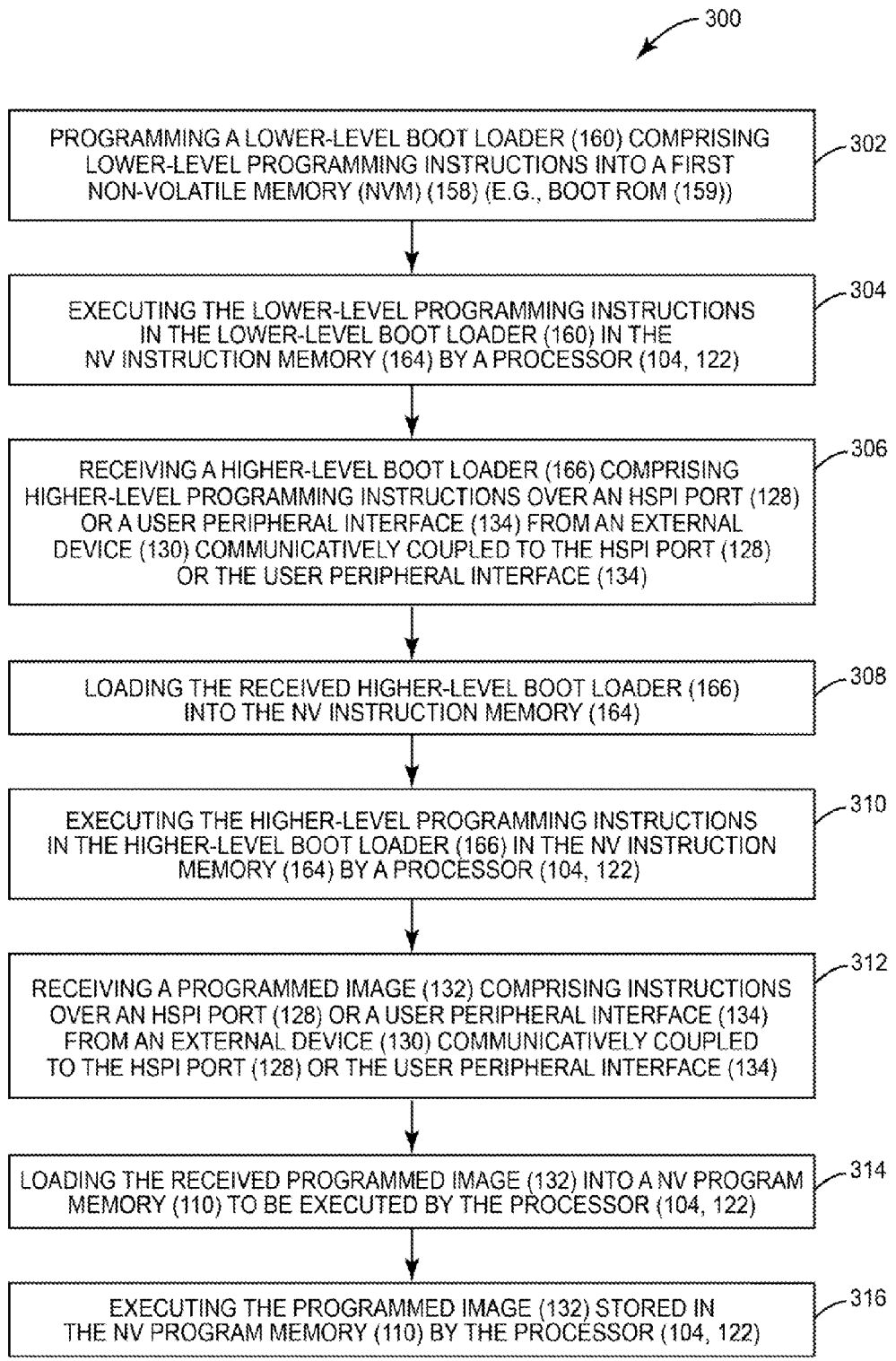
FIG. 3 is a flowchart illustrating a three-step, multi-step programming process for loading a programmed image into NV program memory in the processor-based system in FIG. 1 to be executed by the processor.

FIG. 3 is a flowchart illustrating a three-step, multi-step programming process 300 for loading the programmed image 132 into NV program memory 110 in the processor-based system 100 in FIG. 1. For example, the three-step, multi-step programming process 300 for loading the programmed image 132 into NV program memory 110 in the processor-based system 100 in FIG. 1 may be employed, for example, if the boot ROM 159 in FIG. 1 is provided to store the lower-level boot loader 160. If it is desired to avoid the need for the boot ROM 159 in the processor-based system 100 in FIG. 1, the two-step, multi-step programming process 200 in FIG. 2 discussed above for loading programmed image 132 into NV program memory 110 in the processor-based system 100 in FIG. 1 may be employed.

In this regard, with reference to FIG. 3, the multi-step programming process 300 starts in this example by the lower-level boot loader 160 being loaded into the boot ROM 159 as a first NVM 158 (block 302). The boot ROM 159 may be pre-loaded with the lower-level boot loader 160 before being installed in the processor-based system 100 if the processor-based system 100 is comprised of separate components mounted on a PCB as opposed to a SOC. The boot ROM 159 may also be loaded with the lower-level boot loader 160 by a programming device, such as a JTAG or SWD programming device. Next, the programming instructions in the lower-level boot loader 160 are executed by the processor 104 or 122 to load the higher-level boot loader 166 into the NV instruction memory 164 (block 304). In this regard, the programming instructions in the lower-level boot loader 160 are executed by the processor 104 or 122 to receive the programmed image 132 over the high-speed peripheral interface 127 or the user peripheral interface 134, from the external device 130 coupled to the high-speed peripheral interface 127, as an example (block 306). The received higher-level boot loader 166 is loaded into the NV instruction memory 164 by the processor 104, 122, so that the higher-level boot loader 166 is stored for execution by the processor 104 or 122 to be used to load the programmed image 132 into the NV program memory 110 (block 308) for later execution. As previously discussed above, the higher-level boot loader 166 may have more complex capability to be able to employ higher data transfer rate protocols with higher data rate transfer interfaces to more quickly load the programmed image 132 into the NV program memory 110 during post-packaging processes of the processor-based system 100.

In this regard, with continuing reference to FIG. 3, higher-level boot loader 166 loaded into the NV instruction memory 164 is executed by the processor 104 or 122 to load a programmed image 132 into the NV program memory 110 (block 310). In this regard, the programming instructions in the higher-level boot loader 166 are executed by the processor 104 or 122 to receive the programmed image 132 over the high-speed peripheral interface 127 or the user peripheral interface 134, from the external device 130 coupled to the high-speed peripheral interface 127 (block 312). As discussed above, the data transfer rate that can be achieved by the higher-level boot loader 166 may be higher than the data transfer rate achievable using the lower-level boot loader 160. The received programmed image 132 is loaded into the NV program memory 110 by the processor 104, 122 (block 314), so that the programmed image 132 is stored for execution for operating the processor-based system 100.

Thereafter, on start-up or reset of the processor-based system 100, the programmed image 132 in the NV program memory 110 is accessed from the NV program memory 110 by the processor 104 or 122 (block 316). But, at start-up or reset, the processor 104 or 122 may be configured to execute the programming instructions in the higher-level boot loader 166 in the NV instruction memory 164. The processor 104 or 122 will determine if the programmed image 132 is stored in the NV program memory 110. If the programmed image 132 is stored in is stored in the NV program memory 110 from a previous loading, the processor 104 or 122 will bypass the programming steps in blocks 310 and 312 discussed above.

The processor-based system 100 may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 4:
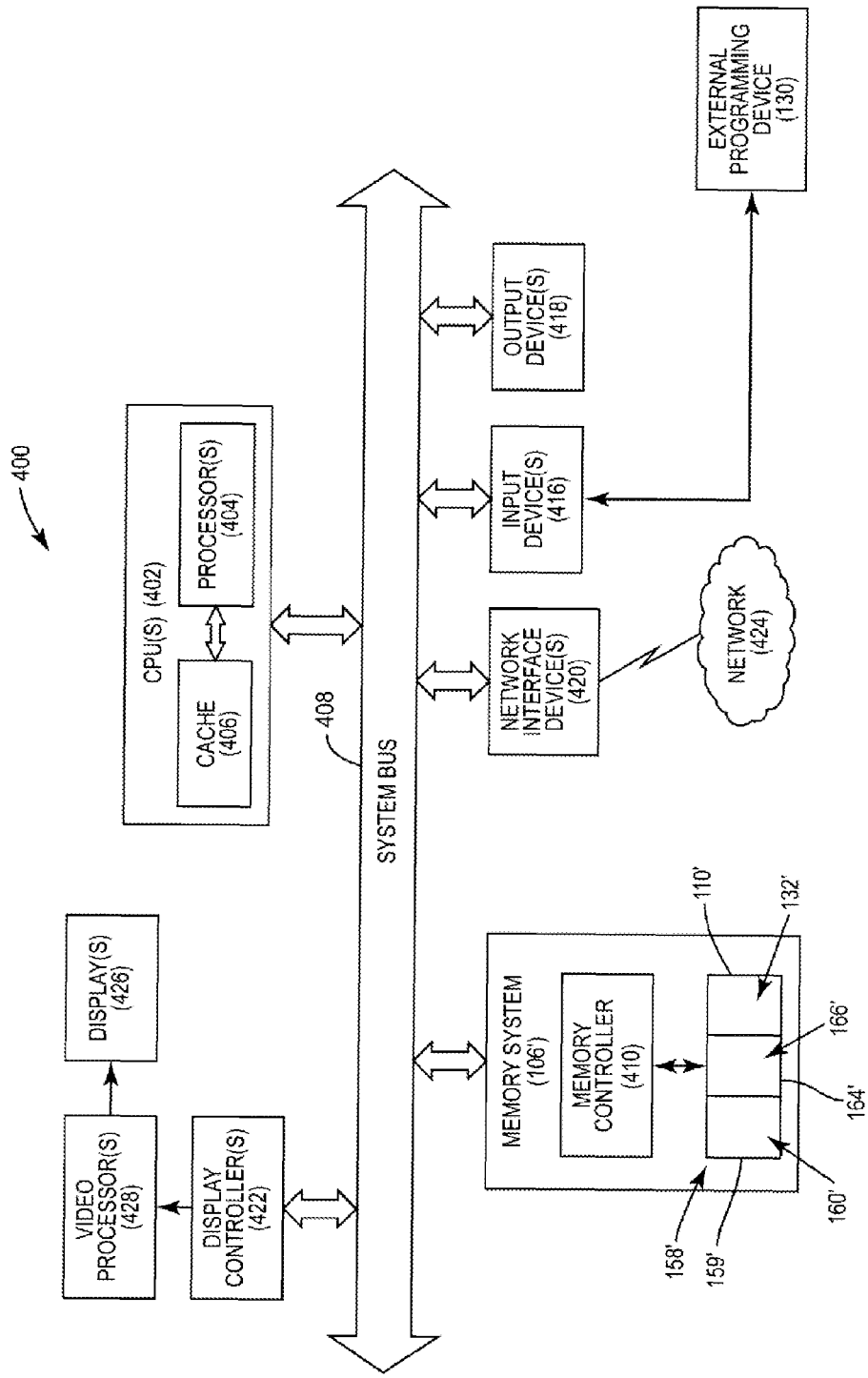
FIG. 4 is a schematic diagram of a generalized representation of an exemplary processor-based system configured to support a multi-step programming of heat-sensitive NVM to load a programmed image into memory, wherein an exemplary computer system is adapted to execute instructions from the loaded programmed image into memory to execute tasks in the processor-based system.

As discussed above with regard to FIG. 1, the processor-based system 100 in this example is provided in the SOC 102. However, the processor-based system 100 in FIG. 1 could also be provided such that the processors 104, 122 and the memory system 106 are provided in separate chips mounted on a PCB and coupled through a system bus printed on the PCB, as opposed to being included with the same chip in the SOC 102. In this regard, FIG. 4 is a schematic diagram of a generalized representation of another exemplary processor-based system 400 configured to support a multi-step programming of heat-sensitive NVM to load a programmed image into memory, wherein an exemplary computer system is adapted to execute instructions from the loaded programmed image into memory to execute tasks in the processor-based system. The processor-based system 400 may also be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player With reference to FIG. 4, the processor-based system 400 may be configured to perform a multi-step programming process for loading a programmed image into NV program memory to be executed by the processor, such as during post-packaging processes, as discussed above. The processor-based system 400 may be connected (e.g., networked) to other machines in a local area network (LAN), an intranet, an extranet, or the Internet. While only a single device is illustrated, the term "device" shall also be taken to include any collection of devices that individually or jointly execute a set (or multiple sets) of instructions to perform any one or more of the methodologies discussed herein. The processor-based system 400 may be a circuit or circuits included in an electronic board card, such as, a PCB, a server, a personal computer, a desktop computer, a laptop computer, a personal digital assistant (PDA), a computing pad, a mobile device, or any other device, and may represent, for example, a server or a user's computer.

The exemplary processor-based system 400 in this aspect includes one or more central processing units (CPUs) 402, each including one or more processors 404. The CPU(s) 402 may have cache memory 406 coupled to the processor(s) 404 for rapid access to temporarily stored data. The CPU(s) 402 is coupled to a system bus 408 and can intercouple master and slave devices included in the processor-based system 400. As is well known, the CPU(s) 402 communicates with these other devices by exchanging address, control, and data information over the system bus 408. Although not illustrated in FIG. 4, multiple system buses 408 could be provided, wherein each system bus 408 constitutes a different fabric. For example, the CPU(s) 402 can communicate bus transaction requests to a memory controller 410 in a memory system 106' as an example of a slave device.

The memory system 106' may include a first NVM 158' in the form of a boot ROM 159' configured to store a lower-level boot loader 160' and/or an NV instruction memory 164' configured to store a higher-level boot loader 166', and a NV program memory 110' configured to store a programmed image 132', similar to that included in the processor-based system 100 in FIG. 1. In this example, the memory controller 410 is configured to provide memory access requests to memory in the memory system 106'.

Other master and slave devices can be connected to the system bus 408. As illustrated in FIG. 4, these devices can include the memory system 106', one or more input devices 416, one or more output devices 418, one or more network interface devices 420, and one or more display controllers 422, as examples. The input device(s) 416 can include any type of input device, including but not limited to input keys, switches, voice processors, etc. The output device(s) 418 can include any type of output device, including but not limited to audio, video, other visual indicators, etc. The network interface device(s) 420 can be any devices configured to allow exchange of data to and from a network 424. The network 424 can be any type of network, including but not limited to a wired or wireless network, a private or public network, a local area network (LAN), a wide local area network (WLAN), and the Internet. The network interface device(s) 420 can be configured to support any type of communications protocol desired.

The CPU(s) 402 may also be configured to access the display controller(s) 422 over the system bus 408 to control information sent to one or more displays 426. The display controller(s) 422 sends information to the display(s) 426 to be displayed via one or more video processors 428, which process the information to be displayed into a format suitable for the display(s) 426. The display(s) 426 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A processor-based system, comprising:
a magnetic random access memory (MRAM) having a first heat sensitivity and that is configured to store a programmed image comprising program instructions;
a processor configured to access the program instructions stored in the programmed image in the MRAM and execute the program instructions;
a peripheral interface configured to exchange data between the processor and an external programming device that is external to the processor-based system and that is communicatively coupled to the peripheral interface; and
a first non-volatile memory (NVM) having a second heat sensitivity lower than the first heat sensitivity, and that is configured to store, during fabrication of the processor-based system, a programmed boot loader comprising programming instructions configured to be executed by the processor to exchange data with the peripheral interface;
the processor configured to execute the programming instructions in the programmed boot loader in the first NVM to:
receive, during fabrication of the processor-based system, the programmed image over the peripheral interface from the external programming device communicatively coupled to the peripheral interface; and
load the received programmed image into the MRAM.

2. The processor-based system of claim 1, wherein the peripheral interface is comprised of a high-speed peripheral interface configured to exchange data between the processor and an external device at a bit transfer rate of at least 100 Megabits per second (Mbps).

3. The processor-based system of claim 1, wherein the peripheral interface is comprised of a high-speed peripheral interface selected from the group consisting of: a Mobile Industry Processor Interface (MIPI) peripheral interface, a universal serial bus (USB) peripheral interface, a high speed secure digital input output (SDIO) interface, a Quad serial peripheral interface (QuadSPI), a dual QuadSPI, and an Ethernet interface.

4. The processor-based system of claim 1, wherein the first NVM is comprised of a one-time writable NVM.

5. The processor-based system of claim 1, wherein the first NVM is comprised of a read-only memory (ROM).

6. The processor-based system of claim 1, wherein the first NVM is comprised of the MRAM.

7. The processor-based system of claim 1 integrated into an integrated circuit (IC).

8. The processor-based system of claim 1 integrated into a device selected from the group consisting of: a set top box; an entertainment unit; a navigation device; a communications device; a fixed location data unit; a mobile location data unit; a mobile phone; a cellular phone; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; and a portable digital video player.

9. A method of programming heat-sensitive non-volatile memory (NVM) in a processor-based system, comprising:
loading, during fabrication of the processor-based system, a boot loader comprising programming instructions into a first non-volatile memory (NVM) in the processor-based system, wherein the first NVM has a first heat sensitivity;
executing the programming instructions in the boot loader by a processor for:
receiving, during fabrication of the processor-based system, a programmed image comprising instructions over a peripheral interface from a first external programming device that is external to the processor-based system and that is communicatively coupled to the peripheral interface; and
loading the received programmed image into a magnetic random access memory (MRAM) to be executed by the processor, wherein the MRAM has a second heat sensitivity that is higher than the first heat sensitivity.

10. The method of claim 9, comprising loading the boot loader into the first NVM in the processor-based system prior to performing packaging processes for the processor-based system.

11. The method of claim 9, comprising executing the programming instructions in the boot loader by the processor during a post-packaging process of the processor-based system.

12. The method of claim 9, comprising loading the boot loader into the first NVM in the processor-based system from a second external programming device.

13. The method of claim 9, wherein the first external programming device is comprised from the group consisting of a Joint Test Action Group (JTAG) interface and a serial wire debug (SWD) interface programming device.

14. The method of claim 9, comprising receiving the programmed image over the peripheral interface from the first external programming device at a bit transfer rate of at least 100 Megabits per second (Mbps).

15. A processor-based system, comprising:
a processor;
a peripheral interface configured to exchange data between the processor and an external programming device that is external to the processor-based system and that is communicatively coupled to the peripheral interface; and
a first non-volatile memory (NVM) configured to store, during fabrication of the processor-based system, a lower-level boot loader comprising lower-level programming instructions;
a non-volatile (NV) instruction memory having a first heat sensitivity, and that is configured to store a higher-level boot loader comprising higher-level programming instructions configured to be executed by the processor to exchange data with the peripheral interface; and
a non-volatile (NV) program memory having a second heat sensitivity that is higher than the first heat sensitivity, and that is configured to store a programmed image comprising program instructions;
the processor configured to access program instructions stored in the programmed image in the NV program memory and execute the program instructions;
the processor further configured to:
execute, during fabrication of the processor-based system, the lower-level programming instructions in the lower-level boot loader in the first NVM to load the higher-level boot loader into the NV instruction memory; and
execute the higher-level programming instructions in the higher-level boot loader in the NV instruction memory to:
receive, during fabrication of the processor-based system, the programmed image from the peripheral interface from the external programming device communicatively coupled to the peripheral interface; and
load the received programmed image into the NV program memory.

16. The processor-based system of claim 15, wherein the peripheral interface is comprised of a high-speed peripheral interface configured to exchange data between the processor and the external programming device at a bit transfer rate of at least 100 Megabits per second (Mbps).

17. The processor-based system of claim 15, wherein the peripheral interface is comprised of a high-speed peripheral interface selected from the group consisting of: a Mobile Industry Processor Interface (MIPI) peripheral interface, a universal serial bus (USB) peripheral interface, a high speed secure digital input output (SDIO) interface, a Quad serial peripheral interface (QuadSPI), a dual QuadSPI, and an Ethernet interface.

18. The processor-based system of claim 15, wherein the first NVM is comprised of a one-time writable NVM.

19. The processor-based system of claim 15, wherein the first NVM is comprised of a read-only memory (ROM).

20. The processor-based system of claim 15, wherein the NV program memory is comprised of a MRAM.

21. The processor-based system of claim 15, wherein the processor is configured to load the received programmed image into a second NVM comprised of the NV instruction memory.

22. The processor-based system of claim 15 integrated into an integrated circuit (IC).

23. The processor-based system of claim 15 integrated into a device selected from the group consisting of: a set top box; an entertainment unit; a navigation device; a communications device; a fixed location data unit; a mobile location data unit; a mobile phone; a cellular phone; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; and a portable digital video player.

24. A method of programming heat-sensitive non-volatile memory (NVM) in a processor-based system, comprising:
loading, during fabrication of the processor-based system, a lower-level boot loader comprising lower-level programming instructions into a first non-volatile memory (NVM) in the processor-based system;
executing the lower-level programming instructions in the lower-level boot loader in the first NVM by a processor for:
receiving, during fabrication of the processor-based system, a higher-level boot loader comprising higher-level programming instructions over a peripheral interface from a first external programming device that is external to the processor-based system and that is communicatively coupled to the peripheral interface; and
loading the received higher-level boot loader into a non-volatile (NV) instruction memory, wherein the NV instruction memory has a first heat sensitivity; and
executing the higher-level programming instructions in the higher-level boot loader in the NV instruction memory by a processor for:
receiving, during fabrication of the processor-based system, a programmed image comprising instructions over the peripheral interface from a second external programming device that is external to the processor-based system and that is communicatively coupled to the peripheral interface; and
loading the received programmed image into a non-volatile (NV) program memory to be executed by the processor, wherein the NV program memory has a second heat sensitivity that is higher than the first heat sensitivity.

25. The method of claim 24, comprising loading the lower-level boot loader comprising lower-level programming instructions into the first NVM in the processor-based system prior to performing packaging processes for the processor-based system.

26. The method of claim 24, comprising executing the lower-level programming instructions in the lower-level boot loader by the processor during a post-packaging process of the processor-based system.

27. The method of claim 24, comprising executing the higher-level programming instructions in the higher-level boot loader by the processor during a post-packaging process of the processor-based system.

28. The method of claim 24, comprising loading the lower-level boot loader into the first NVM in the processor-based system from a third external programming device.

29. The method of claim 28, wherein the external programming device is selected from the group consisting of: a Joint Test Action Group (JTAG) interface, and a serial wire debug (SWD) interface programming device.

30. The method of claim 24, comprising receiving the higher-level programming instructions over the peripheral interface from the first external programming device at a bit transfer rate of at least 100 Megabits per second (Mbps).

31. The method of claim 24, comprising receiving the programmed image over the peripheral interface from the second external programming device at a bit transfer rate of at least 100 Mbps.

\* \* \* \* \*